(12) United States Patent
Olivier (10) Patent No.: US 8,730,203 B2
(45) Date of Patent: May 20, 2014

(54) METHOD AND DEVICE FOR ACQUISITION OF DATA FROM A MULTICONTACT MATRIX TACTILE SENSOR

(75) Inventor: Julien Olivier, Bordeaux (FR)

(73) Assignee: Stantum, Bordeaux (FR)

( * ) Notice: Subject to any disclaimer, the term of this patent is extended or adjusted under 35 U.S.C. 154(b) by 231 days.

(21) Appl. No.: 13/224,762

(22) Filed: Sep. 2, 2011

(65) Prior Publication Data

US 2012/0200512 A1 Aug. 9, 2012

(30) Foreign Application Priority Data

Feb. 3, 2011 (FR) ...................................... 11 50868
Jun. 24, 2011 (FR) ...................................... 11 55655

(51) Int. Cl.
*G06F 3/044* (2006.01)
(52) U.S. Cl.
USPC .......................................................... 345/174
(58) Field of Classification Search
USPC ............. 178/18.01, 18.03; 324/686; 345/156, 345/173, 174; 715/702
See application file for complete search history.

(56) References Cited

U.S. PATENT DOCUMENTS

| | | | | |
|---|---|---|---|---|
| 2009/0095540 | A1* | 4/2009 | Zachut et al. | 178/18.03 |
| 2009/0096757 | A1* | 4/2009 | Hotelling et al. | 345/173 |
| 2009/0251438 | A1* | 10/2009 | Westerman et al. | 345/174 |
| 2009/0256817 | A1* | 10/2009 | Perlin et al. | 345/174 |

FOREIGN PATENT DOCUMENTS

| | | |
|---|---|---|
| EP | 1 719 047 B1 | 7/2008 |
| WO | WO 2008/139050 A1 | 11/2008 |

OTHER PUBLICATIONS

French Preliminary Search Report issued Dec. 2, 2011 in patent application No. 1155655 with English Translation of Category of Cited Documents.

\* cited by examiner

*Primary Examiner* — Dwayne Bost
*Assistant Examiner* — Sepehr Azari
(74) *Attorney, Agent, or Firm* — Oblon, Spivak, McClelland, Maier & Neustadt, L.L.P.

(57) ABSTRACT

A data acquisition method to acquire data from a multicontact matrix tactile sensor having a matrix array of a cells, includes scanning the cells of the matrix array sequentially, and measuring an electrical characteristic of a cell, which represents a weight of the cell. The method also includes comparing the weight with a predetermined significant weight value interval, storing cell data associated with the cell, where the cell data includes the weight and coordinates of the cell in the matrix array, after the weight is determined to lie within the predetermined significant weight value interval. The method also verifies an existence of a data record associated with neighboring cells in a neighboring zone of the cell, and updates the data record associated with the neighboring cells by storing in the data record data associated with the cell, after the existence of the data record is confirmed.

13 Claims, 5 Drawing Sheets

METHOD AND DEVICE FOR ACQUISITION OF DATA FROM A MULTICONTACT MATRIX TACTILE SENSOR

CROSS-REFERENCE TO RELATED APPLICATIONS

This application claims the benefit under 35 U.S.C. §119 from French Application No. 11 50868, filed Feb. 3, 2011, the entire content of which is incorporated herein by reference.

FIELD OF THE INVENTION

The present invention concerns a method of acquisition of data from a multicontact matrix tactile sensor.

It also concerns such a multicontact matrix tactile sensor and a touch screen comprising, in juxtaposed manner, a display screen and a multicontact matrix tactile sensor.

In general, the present invention concerns the acquisition of representative data from one or more contacts or points of pressure exerted on the surface of a tactile sensor.

BRIEF DESCRIPTION OF THE BACKGROUND ART

A matrix sensor is made up of an assembly of cells disposed in row and in column. In its most common form of operation, these cells are sequentially scanned in order to measure the presence of points of contact or points of pressure. Such multicontact tactile sensors and their analysis method are described, for example, in documents EP 1 719 047 or EP 2 142 980. In document EP 2 142 980, the cells are made up of a material acting as a diode.

Likewise, the present invention concerns tactile sensors using a matrix of active cells, such as those of TFT type (Thin Film Transistor), of photodiode type, which can be directly integrated in the matrix of an LCD screen (Liquid Crystal Display), or even of piezo-electric type.

In document EP 1 719 047, the matrix tactile sensor is made up of a matrix array of strip conductors disposed along rows and columns, cells being thus defined at each intersection of the rows and the columns of the matrix array.

The acquisition of data is done by sequentially scanning each cell of the matrix array, that is, by successively energizing each row of the matrix array and measuring, for each row energized, and at each column successively, an electrical characteristic representative of an impedance level.

The set of these electrical characteristics representative of a level of impedance of each cell is then memorized.

By virtue of this sequential scanning of the cells, it is possible to detect simultaneously several zones of contact on the tactile sensor during each scanning phase.

The data measured, and especially the level of impedance of each cell, are recorded.

Due to the recording of the set of data acquired in each scanning phase, it is necessary to have an electronic memory of large size, thus increasing the manufacturing cost of the tactile sensor.

Furthermore, in the context of a tactile sensor having great sensitivity and possibly containing several thousand cells, depending on the size of its tactile surface, the set of data acquired for each cell is then analyzed to determine surrounding zones, that is, encompassing several neighboring cells in the matrix array and thus corresponding to a single contact or a point of pressure on the tactile surface of the sensor.

This step of determination of surrounding zones thus requires an analysis of the matrix image of the sensor, obtained during the sequential scanning phase, and it induces a latency period in the response of the sensor.

This step of analysis of the set of data stored in memory takes longer to implement as the matrix image stored in memory is more complex. When this analysis step is realized in parallel with a scanning phase, it is necessary to provide a buffer memory size that is sufficient to record at least two matrix images of the sensor at the same time.

BRIEF SUMMARY OF THE INVENTION

The purpose of the present invention is to solve the aforesaid drawbacks and to propose a method of acquisition of data from a multicontact matrix tactile sensor requiring only a limited electronic memory size, and reducing the latency period needed for analysis of the matrix image, thus improving the performance of the system and the ease of use.

For this, the present invention concerns a method of acquisition of data from a multicontact matrix tactile sensor, comprising a matrix array of cells, involving the following steps:
  sequential scanning of the cells of the matrix array;
  measuring of an electrical characteristic at each cell representative of a weight of each cell.

According to the invention, this method of acquisition of data further comprises the following steps, for each cell:
  comparing said weight with one or more predetermined significant weight values;
  recording the data associated with said cell, comprising at least said weight and the coordinates of said cell in the matrix array when the weight belongs to an interval of significant values;
  verifying the existence of a record of data associated with at least one of said neighboring cells contained in a neighboring zone associated with said cell; and
  updating an existing surrounding zone by recording in said existing surrounding zone data associated with said cell if data associated with at least one neighboring cell belonging to said existing surrounding zone have been recorded.

Depending on the type of matrix tactile sensor used, the weight associated with each cell may be different.

In general, the weight corresponds to a factor characterizing how much the cell is touched in the data acquisition process.

In particular, this weight can be calculated according to a measurement of impedance directly accessible from the measurement of an electrical characteristic at each cell.

By comparing this weight with one or more predetermined significant weight values, it is thus possible to verify if the weight is higher than a predetermined significant value, or else lower than a predetermined significant value, or finally within one or more intervals of predetermined significant values.

In general, the comparison step lets one verify if the weight of each cell is significant, that is, if its value really corresponds to a contact at the cell of the matrix tactile sensor.

It will be noted that the predetermined significant values used during the comparison step can vary according to the cell measured or even in time according to the conditions of use of the matrix tactile sensor.

Thus, one makes a selective recording of the data measured for each cell during the steps of sequential scanning and measurement of an electrical characteristic representative of the weight associated with this cell.

Thus, only the data associated with cells corresponding to a point of contact on the matrix tactile sensor are recorded.

Furthermore, the gradual updating of each existing surrounding zone makes it possible to obtain, during the actual data acquisition, the location of the surrounding zones made up of neighboring cells having a significant weight.

The method of acquisition of data according to the invention thus avoids the needless recording of data associated with each cell and eliminates the successive analysis phases of the recorded data in order to determine the surrounding zones, the latter being updated in the course of the data acquisition step.

In practice, the acquisition method further comprises a step of creating a new surrounding zone by recording of data of the cell in the new surrounding zone if no datum associated with a neighboring cell contained in the neighboring zone associated with the cell has been recorded.

The creation of the surrounding zones and their updating are thus realized simultaneously in the course of the acquisition of data during the sequential scanning of the cells of the matrix array.

According to one advantageous embodiment of the invention, the neighboring zone associated with the cell is made up of a parametrizable number of neighboring cells of the cell in the matrix array.

Thus, the step of verification of the existence of a recording of data associated with a neighboring cell is limited to a portion of the matrix array, in the neighborhood of the cell in question.

This portion of the matrix array can thus correspond to a surface of size corresponding basically to the size of a zone of contact on the tactile surface of the sensor, for example, by a finger of the user.

In practice, the neighboring zone of a cell is made up of neighboring cells scanned prior to said cell during the sequential scanning step.

This characteristic further makes it possible to speed up the step of verification, since it is limited to the neighboring cells already scanned, thus disregarding the neighboring cells for which no data record can exist, since they have not yet been subjected to the sequential scanning and measurement of an electrical characteristic.

According to another aspect of the invention, it concerns a device for acquisition of data from a multicontact matrix tactile sensor, comprising a matrix array of cells, comprising:
  means of sequential scanning of the cells of the matrix array;
  means of measuring an electrical characteristic at each cell representative of a weight of each cell.

According to the invention, this data acquisition device further comprises:
  means of comparison of said weight of each cell with one or more predetermined significant weight values;
  means of recording the data associated with the cell, comprising at least the weight and the coordinates of the cell in the matrix array when the weight belongs to an interval of significant values;
  means of verification of the existence of a record of data associated with at least one of the neighboring cells contained within a neighboring zone associated with the cell; and
  means of updating an existing surrounding zone by recording in the existing surrounding zone data associated with the cell if data associated with at least one neighboring cell belonging to the existing surrounding zone have been recorded.

The present invention also concerns a multicontact matrix tactile sensor, comprising a matrix array of strip conductors made up of rows and columns, cells being defined at the intersections of the rows and columns, and means of acquisition of data able to implement the method of acquisition according to the invention.

Finally, it concerns a touch screen, comprising a display screen juxtaposed with a multicontact matrix tactile sensor as previously defined.

This data device, this multicontact matrix tactile sensor and this touch screen have characteristics and advantages similar to those described previously in connection with the method of acquisition of data according to the invention.

BRIEF DESCRIPTION OF THE SEVERAL VIEWS OF THE DRAWINGS

Other features and advantages of the invention also will become apparent in the following description. In the attached drawings, given as nonlimiting examples.

DETAILED DESCRIPTION OF THE INVENTION

Figure 1:
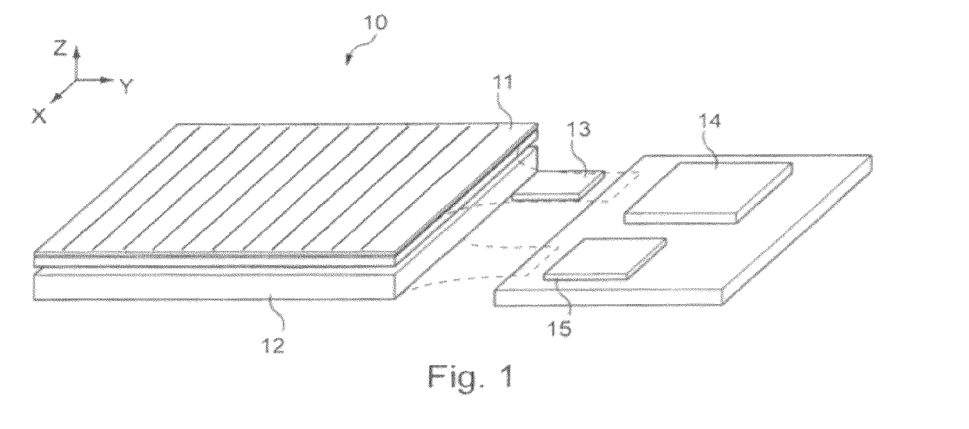
FIG. 1 is a schematic perspective view of a touch screen according to one embodiment of the invention.

First of all, we shall describe a touch screen 10 according to one embodiment of the invention, making reference to FIG. 1.

This touch screen 10 comprises a multicontact matrix tactile sensor 11 juxtaposed with a display screen 12.

In this embodiment, and in nonlimiting manner, the multicontact matrix tactile sensor 11 is disposed above the display screen 12.

In particular, this tactile sensor 11 should be transparent under these conditions, to enable the display of data appearing on the underlying display screen 12.

The touch screen 10 also comprises a capture interface 13, a main processor 14 and a graphics processor 15.

The capture interface 13 in particular makes it possible to acquire data measured at the multicontact tactile sensor 11.

This capture interface 13 contains the acquisition and analysis circuits necessary for the acquisition of data, which then can be transmitted to the main processor 14 for processing, then implementation of various functions of the touch screen 10.

Only the mode of acquisition of data representative of key strokes of the tactile sensor 11 will be explained below, the use of the key strokes by the main processor 14 not being described here.

One will refer advantageously to the exemplary embodiments described in the document EP 1 719 047 regarding the different applications and uses of such a touch screen 10.

Figure 2:
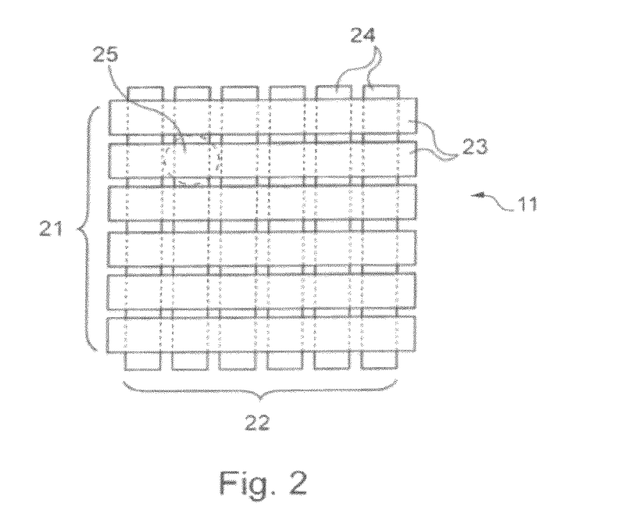
FIG. 2 is a top view showing schematically the arrangement of the rows and columns of strip conductors of a multicontact matrix tactile sensor according to one embodiment.

There is illustrated schematically in FIG. 2 an example of a matrix tactile sensor 11 as implemented in FIG. 1.

This matrix tactile sensor 11 comprises a matrix array 21, 22 of strip conductors, the two arrays 21, 22 being disposed in nonparallel manner.

These arrays 21, 22 of strip conductors thus form rows 23 and columns 24, cells 25 being defined at the intersections of these rows 23 and these columns 24.

Of course, in the entire following description, the notion of rows and columns is interchangeable, depending on the orientation of the matrix tactile sensor 11.

The arrays 21, 22 of strip conductors are made, for example, of a conductive material, preferably translucid, for example by means of transparent metal oxides such as ITO (Indium Tin Oxide), solutions based on metallic nanoparticles, or else miniature conductor threads.

The array of lower strip conductors (for example, the rows 23) can be positioned on a layer of glass and the array of upper strip conductors (for example, the columns 24) can be positioned beneath a layer of polyethylene terephthalate (PET).

A layer of air separates the two arrays 21, 22 of strip conductors such that the rows 23 and the columns 24 are not in electrical contact.

When pressure is applied to the outer surface of the matrix tactile sensor 11, the impedance at each cell 25 corresponding to a touching of the surface of the matrix tactile sensor 11 is modified.

The matrix tactile sensor 11 can be, for example, a sensor of resistive type: upon a touching or a pressing on the outer surface of the matrix tactile sensor 11, the strip conductors of the matrix arrays 21, 22 are placed in contact at one or more cells 25 of the matrix array, such that a contact resistance is created at these cells 25 and it can be detected as explained further below.

Alternatively, the matrix tactile sensor 11 can be a sensor of projected capacitive type: the position of a finger opposite a cell 25 placed at the intersection of a row and a column modifies the impedance in the area of this intersection, which can also be detected as explained further below.

Of course, the exemplary embodiments given above for the matrix tactile sensor 11 are purely illustrative, and the method of acquisition of data described below can apply to all types of tactile sensors defining a matrix array of cells.

The set of means described above in regard to FIG. 1, and especially the capture interface 13 and the microprocessor 14, are adapted to integrate a data acquisition device to implement the data acquisition method that will be described below.

In this regard, the capture interface 13 and the microprocessor 14 integrate in particular means of sequential scanning of the tactile sensor 11 and measurement of an electrical characteristic.

Figure 3:
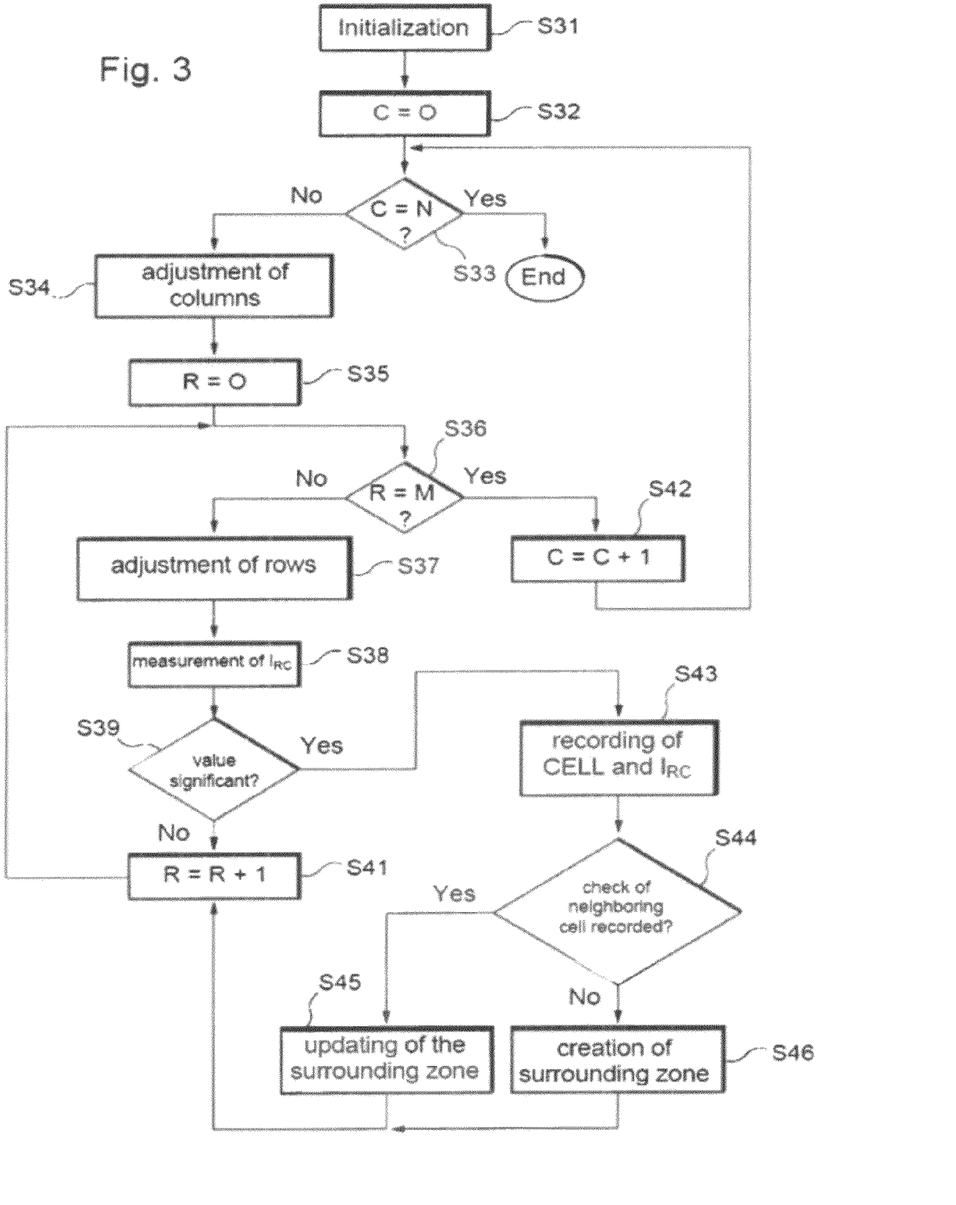
FIG. 3 is a functional diagram detailing the steps of the process of acquisition of data according to one embodiment of the invention.

We shall now describe the method of data acquisition according to one embodiment of the invention, making reference to FIG. 3.

In principle, the method of data acquisition in this embodiment consists in sequentially scanning the different cells 25 of the matrix array to detect the different zones of contact in the area of the matrix tactile sensor during a scanning phase.

The method of acquisition involves, first of all, an initialization step S31 carried out at the start of each new scanning phase in order to reinitialize all of the parameters described hereafter, making it possible to detect the different zones of contact on the matrix tactile sensor 11.

A step of sequential scanning of the cells 25 of the matrix tactile sensor 11 is then performed in order to measure, at each cell 25, an electrical characteristic.

In principle, this sequential scanning step consists in injecting an electrical signal sequentially in an array of strip conductors of the matrix array, and for example the rows 23, and measuring an electrical characteristic on the other array of strip conductors, and for example on the columns 24 in succession.

In the case of a resistive sensor, when a pressure is exerted on the outer surface of the matrix tactile sensor, the rows 23 and the columns 24 come into contact at one or more cells 25 situated at the crossing of the rows and columns, such that the measurement of an electrical characteristic on the terminals of each column, for example a voltage, is representative of a modification of the resistance of the circuit at each cell 25 corresponding to a point of contact.

Similarly, in a sensor of capacitive type, the measurement of an electrical characteristic on the terminals of each column makes it possible to detect the variation in impedance, which is here a level of capacitance, representative of a touch at one or more cells of the matrix array.

The measurement of an electrical characteristic thus makes it possible to obtain a value representative of a weight associated with each cell.

This weight is here a function of the level of impedance (resistance, capacitance) at the cell, which is modified by the presence of a touch opposite the cell.

The steps of sequential scanning and measurement of an electrical characteristic are detailed below making reference to FIG. 3.

In this exemplary embodiment, one considers a matrix array made up of N columns C and M rows R. Such a matrix array thus contains M×N cells.

An initialization step S32 lets one take into account the first column C=0.

In a test step S33, one checks to see if the current column C has the value N.

If so, the step of sequential scanning of the cells 25 is terminated.

If not, one performs the necessary adjustments to obtain a correct measurement at the current column C via a multiplexer. For example, one places all the columns other than the current column C at high impedance Z to prevent the flow of current in these other columns.

These adjustments are done during a step S34.

An initialization step S35 then allows one to consider the first row R=0.

One checks in a test step S36 whether this current row R has the value M.

If not, a step of adjustment S37 of the rows is done via a multiplexer. For example, a selective energization is carried out, in which all the rows other than the current row R are placed at ground via a pull-down resistor.

Thus, only one electrical signal is injected into the current row R.

A measurement step S38 is then carried out to measure an electrical characteristic representative of a weight connected to the level of impedance $I_{RC}$ associated with the cell CELL corresponding to the intersection of the current column C and the current row R.

In this embodiment, the electrical characteristic measured is, for example, a voltage. An ADC (acronym for the English term Analog Digital Converter) circuit lets the analog voltage value be converted into a digital signal, which can then be used during the comparison step S39.

In the context of a capacitive sensor, one would use a CDC (acronym for the English term Capacitance to Digital Converter) circuit.

The comparison step S39 is then carried out to compare the measured weight value with one or more significant weight values corresponding to a real touch on the current cell.

Here, in the context of a measurement of a voltage directly representative of a level of impedance (here, a resistance), the comparison step S39 consists in comparing the level of impedance measured $I_{RC}$ with a predetermined impedance threshold $I_T$.

In the context of a resistive sensor, this impedance threshold value $I_T$ is determined according to the noise level inherent in the electronic system.

Thus, the use of an impedance threshold value $I_T$ makes it possible to eliminate the measurements of stray electrical characteristics associated with the electronic system, and not in reality representing a point of contact on the matrix tactile sensor 11.

It will be noted that this predetermined impedance threshold value $I_T$ can possibly be changed in the matrix tactile sensor 11 to adapt to different electromagnetic environments.

Thus, if at the end of the comparison step S39 the weight is considered to be not significant, that is, if the impedance level measured $I_{RC}$ is less than the predetermined impedance threshold $I_T$, no datum is memorized for the cell R, C and an incrementation step S41 is carried out in order to consider the next row R=R+1.

Steps S36 and following are then reiterated on the next row.

If during the test step S36 the current row value R has reached the limit value M, that is, all the rows R have been scanned, an incrementation step S42 is carried out to consider the next column C=C+1.

All of the steps S33 and following are then reiterated.

Of course, during the comparison step S39 to determine whether the weight value associated with each cell is considered to be significant, other types of comparison can be carried out.

In particular, in the case of a tactile sensor of capacitive type, the weight measured is compared to several predetermined significant values making it possible to determine if the measured weight value is contained within a range of significant values.

Figure 6:
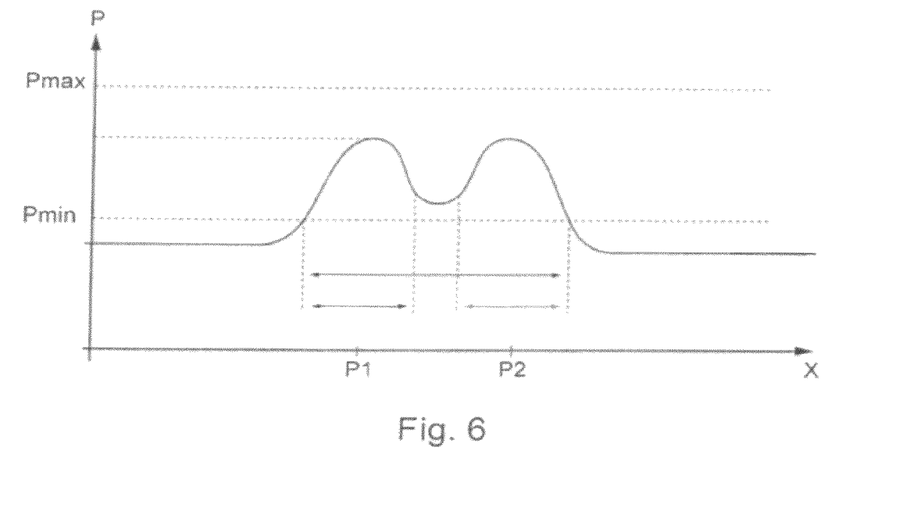
FIG. 6 is a diagram illustrating the weight value measured when two points of pressure are present close to one another on a tactile sensor of capacitive type.
Figure 7:
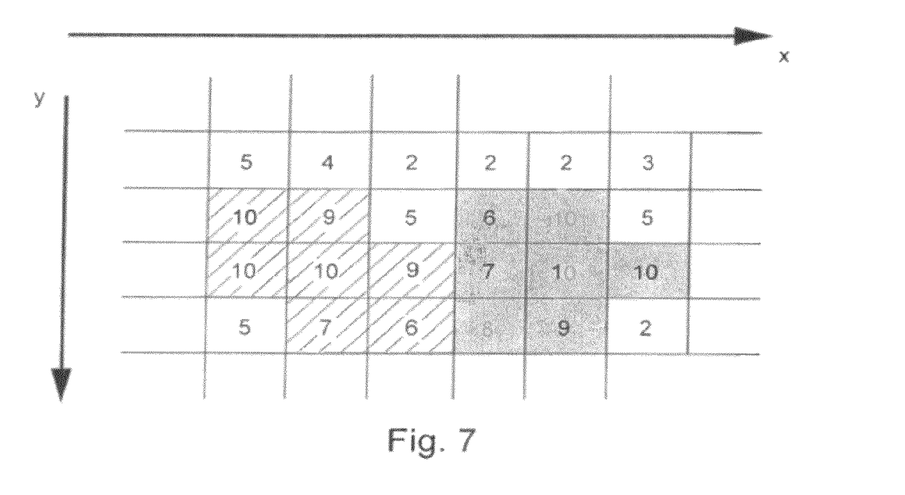
FIGS. 7 and 8 are diagrams illustrating a step of supplemental analysis of the process of data acquisition illustrated in FIG. 3, in the context of an implementation on a tactile sensor of capacitive type.

Now making reference to FIGS. 6 and 7, we shall describe the rest of the process of data acquisition in an embodiment that implements a tactile sensor of capacitive type.

If at the end of the comparison step S39 the weight is considered to be significant, that is, in this example, if the impedance level $I_{RC}$ is greater than the impedance threshold $I_T$, a recording step S43 is carried out.

During the recording step S43, the data associated with the current cell CELL are recorded, in particular, the coordinates of the cell in the matrix array (CELL_X, CELL_Y) as well as the impedance level $I_{RC}$ or weight measured. This impedance level $I_{RC}$ thus characterizes the touch at the cell CELL and here is also known as the weight (WEIGHT) of the cell CELL.

It will thus be noted that only the data corresponding to cells CELL having a significant weight or impedance level are thus recorded during the recording step S43.

A verification step S44 is then carried out to check for the existence of a recording of data associated with one or more neighboring cells Cv contained within a neighboring zone of the current cell CELL.

This verification step S44 will be described in greater detail in reference to FIGS. 4 and 5.

The neighboring zone associated with the current cell CELL is made up of neighboring cells Cv of the cell CELL in the matrix array.

Figure 4:
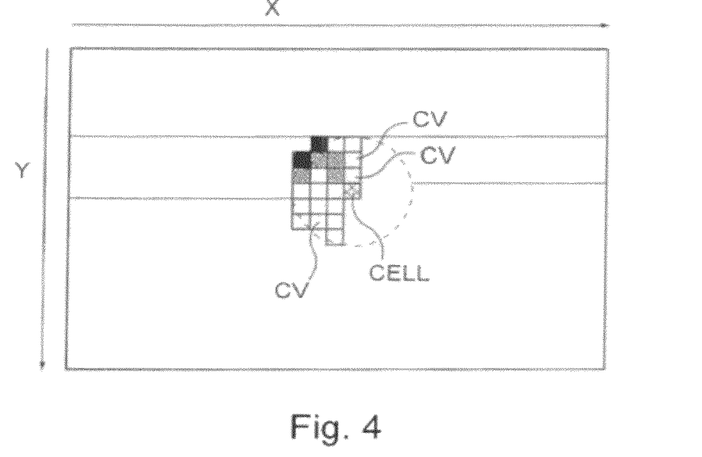
FIG. 4 is a view illustrating neighboring cells contained within a neighboring zone of a matrix array cell.

As well illustrated in FIG. 4, the neighboring zone associated with the processed cell CELL is made up of a predetermined, possibly parametrizable number of neighboring cells Cv of this cell CELL in the matrix array.

In the exemplary embodiment illustrated in FIG. 4, the neighboring zone associated with the cell CELL is defined by the position of this cell, with coordinates CELL_X, CELL_Y in the matrix array of the tactile sensor 11, and a set of neighboring cells Cv situated at a predetermined distance from the cell CELL in the matrix array.

In this example, the predetermined distance corresponds in the horizontal and vertical direction of the matrix array to a distance of three cells at most separating the neighboring cells Cv from the current cell CELL.

Thus, this neighboring zone corresponds basically to the neighboring cells Cv belonging to a circle having as its center the processed cell CELL and as its radius the distance separating the cell CELL from the neighboring cell of coordinates (CELL_X, CELL_Y−3) or the neighboring cell (CELL_X−3, CELL_Y).

We illustrate in FIG. 4 a portion of the cells already scanned, considering a sequential scanning of the cells consisting in energizing each row sequentially from top to bottom of FIG. 4 and measuring sequentially the columns from left to right of FIG. 4.

We illustrate in FIG. 4 by white box the cells scanned for which no datum was recorded, the measured weight not being significant, and by black box the cells scanned whose data was recorded but not belonging to the neighboring zone, and by hatchmarks the cells already scanned whose data was recorded and belonging to the neighboring zone.

It will be noted that, preferably, the neighboring zone is made up solely of neighboring cells Cv scanned prior to the current cell CELL during the sequential scanning step.

Thus, during the verification step S44, this is carried out only on the neighboring cells Cv already scanned during the previously described sequential scanning step.

Preferably, the verification step S44 for the existence of recorded data for cells Cv belonging to the neighboring zone is carried out in order of increasing distance, starting with cells the closest to the current cell CELL.

Figure 5:
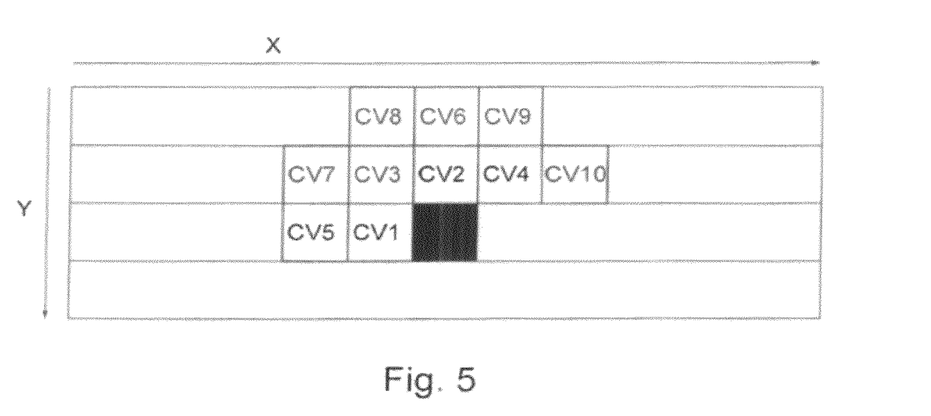
FIG. 5 is a diagram illustrating the step of verification of the existence of a record of data associated with a neighboring cell.

Thus, as illustrated in FIG. 5, we have numbered, as a nonlimiting example, a scanning order for the neighboring cells Cv during the step of verification S44 of the existence of recorded data.

Here, one successively examines the data of the cells Cv1 with coordinates (CELL_X, CELL_Y−1), Cv2 with coordinates (CELL_X−1, CELL_Y), Cv3 with coordinates (CELL_X−1, CELL_Y−1), Cv4 with coordinates (CELL_X−1, CELL$_{13}$ Y+1), etc.

If at the end of the verification step S44 a neighboring cell Cv of the neighboring zone has a recording of data associated with this neighboring cell Cv, a step of updating S45 of an existing surrounding zone is carried out.

During this updating step, the data connected to the current cell CELL are recorded in the existing surrounding zone.

Thus, in the exemplary embodiment illustrated in FIG. 4, the existing surrounding zone after updating will contain all of the data pertaining to the black cells, the hatched cells, and the current cell CELL.

The data recorded for each cell belonging to the existing surrounding zone include, in particular, the coordinates CELL_X, CELL_Y of each cell CELL as well as the impedance level $I_{R, C}$ or measured weight for this cell.

On the other hand, if in the verification step S44 no data connected to a neighboring cell Cv contained in the neighboring zone associated with the current cell CELL has been recorded, then a creation step S46 is carried out to create a new surrounding zone by recording of data of the current cell CELL in this new surrounding zone.

Thus, in the course of the measurement of a characteristic representative of an impedance level during the sequential scanning of the cells of the matrix array, one can create and update the surrounding zones, bringing together the relevant cells that have been recorded.

At the end of the steps of updating S45 or creation S46 of surrounding zones, the acquisition method reiterates all of the steps S36 and following for the next row R=R+1.

The sequential scanning phase is terminated when all the rows R and columns C have been scanned.

During the carrying out of each scanning phase, the entire process illustrated in FIG. 3 is reiterated, all of the parameters recorded for each surrounding zone being reinitialized in the initialization step S31, as previously described.

In order to have good responsiveness of the tactile sensor and follow in real time the changes in touch on the surface of the tactile sensor 11, the sequential scanning phases are carried out at a frequency on the order of 100 times a second.

The above-described acquisition process, and especially steps S43 and following, are supplemented by an additional analysis step in the context of an implementation on a tactile sensor whose output data are analog, that is, in Gaussian form (for example, for sensors of capacitive, inductive, or even pressure type).

As previously noted, in the case of a tactile sensor of capacitive type, for example, the measured weight is compared to several predetermined significant values.

As illustrated in FIG. 6, the measured weight in the context of a capacitive sensor is considered to be significant in the above-described comparison step S39 when the measured weight value is included in a range of significant values Pmin, Pmax.

We have shown in FIG. 6 an example of measured weight values when two contacts or points of pressure are applied to the tactile sensor of capacitive type, close to one another, and here close to one another in the direction X of the matrix grid of the tactile sensor.

In this case, two distinct points of pressure (symbolized by the references P1 and P2 in FIG. 6) can be considered as belonging to the same surrounding zone in the implementation of the above-described acquisition method.

In fact, as illustrated in FIG. 6, the measured weight value for neighboring cells located between the points of pressure P1 and P2 can also be considered to be significant during the comparison step S39, since the weight values induced by the two points of pressure P1 and P2 are cumulative.

In fact, in sensors of capacitive type, the position of the point of pressure is deduced from the variation in charge built up on the lower conducting tracks, induced by the presence of the finger at the upper conducting tracks.

The measured signal corresponding to the charge distribution is a Gaussian signal whose apex (peak) corresponds to the position of the finger.

When two fingers are close and positioned at the upper conducting tracks, the two characteristic electrical signals are added and the measured values are the sum of the two Gaussians characteristic of each finger.

Thus, as illustrated in FIG. 7, during the registration step S43 all of the cells CELL having a significant weight are registered, with the measured weight level represented here as nonlimiting examples for a numerical value between 1 and 11.

As illustrated in FIG. 7, in this embodiment, and solely as an example, a cell has a significant weight when the value of this weight is between 6 and 10, inclusively.

During the above-described verification step S44, the surrounding zone determined after updating will comprise all of the data pertaining at the same time to the cells having a significant weight (hatched cells and gray-shaded cells in FIG. 7).

To prevent this confusion of two surrounding zones corresponding to different points of pressure on the tactile sensor, the verification step S44 is supplemented by the implementing of a step of analysis of the values of the weight measured and registered in the registration step S43 for a set of adjacent cells, including the current cell CELL of coordinates (CELL_X, CELL_Y).

Figure 8:
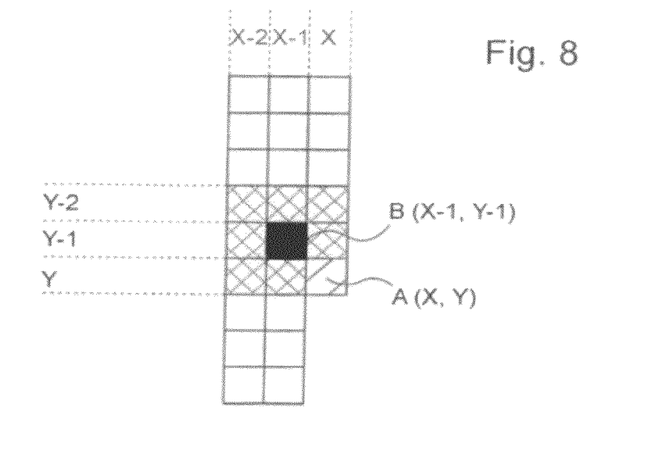

In practice, as illustrated in FIG. 8, for each acquired cell CELL (cell A in FIG. 8) of coordinates (X, Y), one analyzes the characteristics of the cells surrounding the neighboring cell B of coordinates (X−1, Y−1) in FIG. 8.

In practice, one compares the weight levels memorized for all of the cells adjacent to the neighboring cell B of coordinates (X−1, Y−1).

It is thus possible to detect, from the weight values, if the neighboring cell B of coordonates (X−1, Y−1) corresponds to a peak or a valley of the signal as illustrated in FIG. 6.

It will be noted that this step of supplemental analysis requires the presence of an additional buffer memory able to memorize, for the cells already scanned, the weight value measured for each cell belonging to the last three columns and last three rows with respect to the current cell CELL (or cell A in FIG. 8).

When one detects that a neighboring cell B of coordinates (X−1, Y−1) corresponds to a peak with respect to the adjacent cells (weight value greater than or equal to that of the adjacent cells), it is possible to separate the existing surrounding zone into two distinct and adjacent surrounding zones illustrated schematically in FIG. 7, on the one hand by the cells with hatch marks and on the other hand by the gray-shaded cells.

Of course, this analysis process can also be implemented for a greater number of points of pressure close to each other on a tactile sensor of capacitive type, for example, three points. It will be noted that the comparison of the weights two by two between the neighboring cell B of coordinates (X−1, Y−1) and the adjacent cells can be implemented in a predetermined scanning order of the adjacent cells.

It will be further noted that, if the scanning is done row by row from left to right and column by column from top to bottom, one will have, for each neighboring cell B of coordinates (X−1, Y−1), weight values associated with the set of adjacent cells, that is, the set of cells included in the zone of coordinates X−2 and X on the abscissa and in the zone of coordinates Y−2 and Y on the ordinate, as illustrated in FIG. 8.

Figure 9:
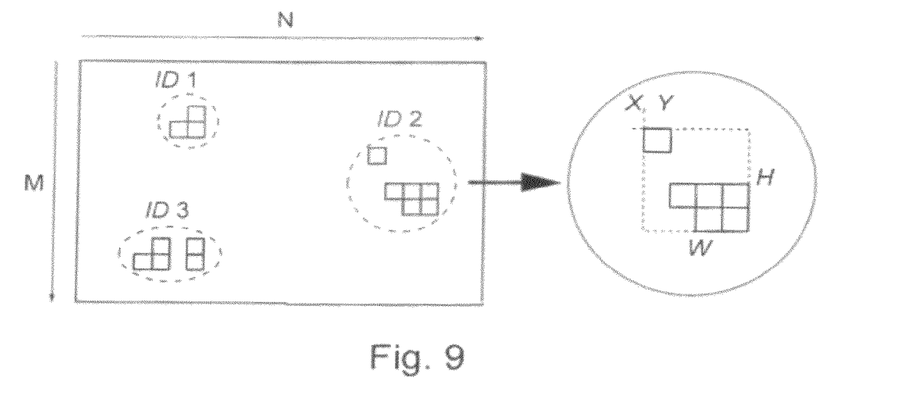
FIG. 9 is a schematic view illustrating surrounding zones made up of a set of cells of the matrix array.

We illustrate in FIG. 9 an example of a matrix array for which three surrounding zones ID1, ID2, ID3 have been detected.

As previously mentioned, each surrounding zone is characterized in particular by the coordinates of each cell CELL making up this surrounding zone, as well as the impedance level or weight associated with each of these cells.

Furthermore, each surrounding zone is characterized, by way of nonlimiting example, by the height H and the width W of a rectangle circumscribing all of the cells CELL making up the surrounding zone.

Moreover, the position of the surrounding zone can also be defined by the coordinates of a specific point of this surrounding zone, and for example the coordinates X, Y of the upper left corner of the rectangle circumscribed around the cells making up the surrounding zone in the matrix array.

The surrounding zone is also characterized by the cumulative weight corresponding to the sum of the impedance levels or weights of each cell CELL belonging to the surrounding zone.

Of course, all of these parameters characterizing the surrounding zone (height H, width W, position of the upper left corner X, Y, cumulative weight, number of cells CELL belonging to the surrounding zone, as well as their coordinates CELL_X, CELL_Y and their impedance level or associated weight) are updated during each update step S45 of the surrounding zone once a new cell has been added to this surrounding zone.

Thus, at the end of the data acquisition process, one has a set of surrounding zones and previously described parameters characterizing them.

In order to manage each zone of contact or pressure corresponding to each surrounding zone thus formed, one determines coordinates of a single point associated with this surrounding zone.

This determination of a single point in the matrix array of the tactile sensor 11 lets us associate a single point with each touch made on the tactile surface of the sensor 11, so as to then follow the changes over time during each successive scanning phase.

One solution can be to consider as the single point the point having as its coordinates in the matrix array the geometrical center of the rectangle circumscribed around the set of cells making up the surrounding zone.

Figure 10:
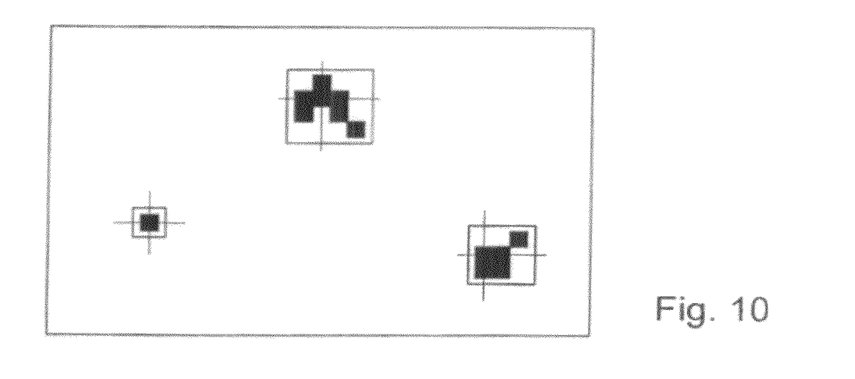
FIG. 10 is a diagram illustrating the step of calculation of the position of a center of gravity of a surrounding zone so as to determine a cursor.

However, in order to take into account the distribution of the cells in the surrounding zone as well as the impedance values or weight associated with each of these cells, the point of contact is preferably determined by calculating a center of gravity of the surrounding zone, starting with coordinates CELL_X, CELL_Y of each cell CELL belonging to the surrounding zone, weighted by the impedance level $I_{R,\ C}$ or weight connected with each cell.

To carry out this calculation of the center of gravity, one uses the cumulative weight value previously defined, corresponding to the sum of the impedance levels $I_{R,\ C}$ or weights of each cell CELL belonging to the existing surrounding zone.

The calculation of the center of gravity is carried out classically by weighting the coordinates CELL_X, CELL_Y of each cell on the two axes X, Y by its impedance level or weight, in relation to the cumulative weight of the surrounding zone.

The unique position in the matrix sensor can then correspond in a touch screen to the position of a cursor on the display screen as illustrated in FIG. 10. This cursor making it possible to command a certain number of actions on this screen or on a peripheral computer device controlled by this touch screen.

By virtue of the above-described method, the detection of the surrounding zones is done in real time during the data acquisition and the sequential scanning of the sensor.

By virtue of this simultaneous processing of the data acquired, the required memory space is reduced.

In fact, the classical algorithms require the processing and the storage of all the data associated with the matrix arrays, and for example a memory space sufficient to store, in the previous example, M×N impedance values $I_{R,\ C}$.

If, furthermore, one wishes a parallel data acquisition with the processing and analysis of this data, buffer memories need two to three times this memory space.

By virtue of the above-described method, by recording only the data pertaining to the surrounding zones, and in real time, and not all of the cells of the matrix array, the needed memory size can be greatly reduced.

Furthermore, the time of processing of the data furnished by the tactile sensor is reduced.

The responsiveness of the tactile sensor to the user's touch is thus augmented, affording a better comfort of use.

The invention claimed is:

1. A data acquisition method for acquiring data from a multicontact matrix tactile sensor that has a matrix array of a plurality of cells, the method comprising:
    scanning the plurality of cells of the matrix array sequentially;
    measuring an electrical characteristic of a first cell of the plurality of cells, the electrical characteristic being representative of a weight of the first cell;
    comparing the weight with a predetermined significant weight value interval;
    storing cell data associated with the first cell, the cell data including the weight and coordinates of said first cell in the matrix array, after said step of comparing has determined that the weight of the first cell lies within the predetermined significant weight value interval;
    verifying an existence of a data record associated with neighboring cells located in a neighboring zone of said first cell; and
    updating the data record associated with the neighboring cells of said first cell by storing the cell data associated with said first cell, and which includes the weight of the first cell, in the data record associated with the neighboring cells, after said step of verifying has determined the existence of the data record associated with the neighboring cells.

2. The data acquisition method according to claim 1, further comprising:
    creating a new data record associated with the neighboring cells of said first cell, after said step of verifying has determined that there is no data record associated with the neighboring cells.

3. The data acquisition method according to claim 1, wherein the neighboring zone associated with said first cell includes a configurable number of neighboring cells of said first cell in the matrix array.

4. The data acquisition method according to claim 1, wherein the neighboring zone associated with said first cell is defined by a position of said first cell in the matrix array and a set of cells that are situated at a predetermined distance from said first cell in the matrix array.

5. The data acquisition method according to claim 1, wherein the neighboring zone includes a set of cells that were scanned before to said first cell in said step of scanning.

6. The data acquisition method according to claim 1, wherein the data record associated with the neighboring cells includes a cumulative weight corresponding to a sum of the weights of each cell belonging to said neighboring zone, and said step of updating further comprises:
    updating the cumulative weight.

7. The data acquisition method according to claim 6, further comprising:
    calculating a position of a center of gravity of the neighboring zone based on the coordinates of the first cell, coordinates of the cells belonging to said neighboring zone, and the weights of the first cell and the cells belonging to said neighboring zone in relation to said cumulative weight.

8. The data acquisition method according to claim 1, wherein the plurality of cells are defined by an intersection area of a row and a column of an array of strip conductors that is made up of rows and columns forming the matrix array, and wherein said step of measuring further comprises:
measuring, for each row energized by said step of scanning and for each column, the electrical characteristic representative of an impedance level.

9. The data acquisition method according to claim 1, the data record including weights associated with the neighboring cells, further comprising the step of:
analyzing the weight of the first cell and the weights of the neighboring cells from the data record so as to identify two adjacent zones that are located within said neighboring zone of said first cell.

10. A device for acquiring data from a multicontact matrix tactile sensor having a matrix array of a plurality of cells, the device comprising:
scanning means for scanning the plurality of cells of the matrix array sequentially;
measuring means for measuring an electrical characteristic of a first cell of the plurality of cells, the electrical characteristic being representative of a weight of the first cell,
comparing means for comparing the weight with a predetermined significant weight value interval;
memory means for storing cell data associated with the first cell, the cell data including the weight and coordinates of said first cell in the matrix array, after said comparing means has determined that the weight of the first cell lies within the predetermined significant weight value interval;
verification means for verifying an existence of a data record in the memory means associated with neighboring cells located in a neighboring zone of said first cell; and
updating means for updating the data record associated with the neighboring cells of said first cell by storing the cell data associated with said first cell, and which includes the weight of the first cell, in the data record associated with the neighboring cells, after said verification means has determined the existence of the data record associated with the neighboring cells.

11. A device configured to acquire data from a multicontact matrix tactile sensor having a matrix array of a plurality of cells, the device comprising:
a scanning unit configured to scan the plurality of cells of the matrix array sequentially;
a measurement unit configured to measure an electrical characteristic of a first cell of the plurality of cells, the electrical characteristic being representative of a weight of the first cell,
a microprocessor configured to compare the weight with a predetermined significant weight value interval; and
a memory configured to store cell data associated with the first cell, the cell data including the weight and coordinates of said first cell in the matrix array, after said microprocessor has determined that the weight of the first cell lies within the predetermined significant weight value interval,
wherein the microprocessor is further configured to verify an existence of a data record in the memory associated with neighboring cells located in a neighboring zone of said first cell, and is configured to update the data record associated with the neighboring cells of said first cell by storing in memory the cell data associated with said first cell, and which includes the weight of the first cell, in the data record associated with the neighboring cells, after said microprocessor has determined the existence of the data record associated with the neighboring cells in the memory.

12. A multicontact matrix tactile sensor, comprising:
rows of strip conductors;
columns of strip conductors; and
a device configured to acquire data from the multicontact matrix tactile sensor according to claim 10,
wherein the rows and the columns are arranged as a matrix, and a plurality of cells are defined by intersections of said rows and said columns.

13. A tactile screen comprising a display screen juxtaposed with a multicontact matrix tactile sensor according to claim 10.

* * * * *